United States Patent

Yamamoto et al.

[11] Patent Number: 5,448,150
[45] Date of Patent: Sep. 5, 1995

[54] VECTOR CONTROL UNIT FOR AN INDUCTION MOTOR

[75] Inventors: Yoichi Yamamoto; Tsugutoshi Otani, both of Yukuhashi, Japan

[73] Assignee: Kabushiki Kaisha Yaskawa Denki, Kitakyushu, Japan

[21] Appl. No.: 185,809

[22] PCT Filed: Jun. 15, 1993

[86] PCT No.: PCT/JP93/00798
 § 371 Date: Feb. 14, 1994
 § 102(e) Date: Feb. 14, 1994

[87] PCT Pub. No.: WO93/26081
 PCT Pub. Date: Dec. 23, 1993

[30] Foreign Application Priority Data

Jun. 16, 1992 [JP] Japan ................ 4-156970

[51] Int. Cl.$^6$ ............................................. H02P 5/408
[52] U.S. Cl. ...................................... 318/805; 318/804; 318/808
[58] Field of Search ............... 318/800, 801, 803, 805, 318/807, 808, 809, 810, 804

[56] References Cited

U.S. PATENT DOCUMENTS

| 4,418,308 | 11/1983 | Bose | 318/803 |
| 4,600,874 | 7/1986 | Tupper et al. | 318/805 |
| 5,168,204 | 12/1992 | Schauder | 318/800 |
| 5,231,339 | 7/1993 | Kishimoto et al. | 318/807 |

FOREIGN PATENT DOCUMENTS 0436138 7/1991 European Pat. Off. .

Primary Examiner—William M. Shoop, Jr.
Assistant Examiner—John W. Cabeca
Attorney, Agent, or Firm—Oblon, Spivak, McClelland, Maier & Neustadt

[57] ABSTRACT

A vector control unit that has an inverter connected with an induction motor which is not only electrically driven but is also being operated in a regenerative condition. The vector control unit comprises a detection circuit for detecting that the induction motor is being operated at a low speed and for detecting that signs of a rotor electrical angular velocity command and a slip angular velocity command differ from each other, and a control circuit for performing control such that the slip angular velocity command is not included in the angular velocity command when the induction motor is being operated at low speed and the signs of the rotor electrical angular velocity command and the slip angular velocity command differ from each other.

4 Claims, 6 Drawing Sheets

VECTOR CONTROL UNIT FOR AN INDUCTION MOTOR

BACKGROUND OF THE INVENTION

1. Field of the Invention

The present invention relates to a vector control unit for an induction motor connected with an inverter, the motor being not only electrically driven but also working in a regenerative condition.

2. Description of the Related Art

A slip frequency control method characterized by both excellent responsiveness and accuracy in control has been known as a variable speed control method for an induction motor. Particularly, a vector control method which can provide responsiveness equivalent to that of a D.C. motor, by controlling a primary current of the induction motor, dividing it into an excitation current and a torque current, and controlling a secondary magnetic flux and the torque current in such a way that their directions are constantly kept in a perpendicular relationship to each other, has been put into force. Recently, a speed sensor has been removed from the method (hereinafter referred to as a PG-less method) and the method has been improved through simplification and improving resistance against adverse environmental conditions.

A PG-less induction motor control unit usually comprises, as shown in FIG. 1, a converter unit which consists of a diode and a capacitor and which converts an electric current from an A.C. source to D.C., a voltage type PWM inverter 1 consisting of an inverter unit for generating A.C. voltage by modulating voltage commands of U-, V-, and W-phase output from a current controller to PWM signals by means of a switching element such as a thyristor or IGBT; electric current detectors $10_1$, $10_2$, $10_3$ for detecting electric currents which flow in U-, V-, and W-phases, respectively, of an induction motor 2; a voltage detector 11 for detecting voltages between two of the U-, V-, and W-phases; a vector control unit 3 for performing vector control; and a command generator 19.

FIG. 2 is a block diagram showing the vector control unit 3 shown in FIG. 1.

The vector control unit 3 is composed of a coefficient meter 4; integrator 5; a function generator 6 which inputs phase $\theta\psi^*$ and generates $\exp(j\theta\psi^*)$, i.e., $\cos\theta\psi^* + j\sin\theta\psi^*$; a two-phase/three-phase converter 7 which converts a vector having components in the direction of a magnetic flux (hereinafter referred to as a "d axis") and in the direction perpendicular thereto (hereinafter referred to as a "q axis") into a vector having components in the directions of the U-, V-, and W-phases which have phase differences of 120° from one another; a vector operation unit 8 for performing the operation of a vector of $r = \alpha + j\beta$ which represents a d-axis component $\alpha$ and a q-axis component $\beta$, that is, an amplitude $|r| = (\alpha^2+\beta^2)^{\frac{1}{2}}$ and a phase $\tan^{-1}(\beta/\alpha)$; a vector rotator 9 which inputs vector r and $\exp(j\theta\psi^*)$ and arranges its phase to $\theta\psi^* + \tan^{-1}(\beta/\alpha)$; a magnetic flux operation unit 12 for detecting a magnetic flux and a torque current by using a primary voltage vector $v_l$ obtained from a voltage detector 11 and a primary current vector $i_1$ obtained from the current detectors $10_1$, $10_2$, $10_3$; a velocity presuming unit 13 for presuming an electrical angular velocity of a rotor by using a torque current detection value $I\tau$ obtained by the magnetic flux operation unit 12 and a torque current command $I\tau^*$; a magnetic flux command generator 14 which performs field-weakening control based on the magnitude of the electrical angular velocity of the rotor; subtracters $15_1$, $15_2$; a velocity controller 16 for eliminating the error between an angular velocity command $\omega r^*$ from a command generator 19 and a presumed angular velocity $\omega r$ to perform PI control; a magnetic flux controller 17 for eliminating the magnetic flux error $\Delta\psi_2$ between a magnetic flux command $\psi_2^*$ and a detected magnetic flux $\psi_2$ to perform PI control; electric current controllers $18_1$, $18_2$, $18_3$ provided for every U-, V-, and W-phase for eliminating the error between a command value and a detected value of a primary current to perform P control; subtracters $20_1$ to $20_5$; and an adder 21. The torque current command $I\tau^*$ is obtained by dividing a torque command $T^*$ to be acquired as an output of the velocity controller 16 by the magnetic flux command $\psi_2^*$ to be obtained as an output of the magnetic flux command generator 14. An excitation current command $I\psi^*$ is obtained as an output of the magnetic flux controller 17.

The operation of the present conventional example will next be described.

When motor constants are expressed by an asymmetrical T type equivalent circuit shown in FIG. 3, the relation between the voltage and the electric current of the induction motor 2 is given by expression (1) in a static coordinate system.

$$\begin{bmatrix} v_1 \\ O \end{bmatrix} = \begin{bmatrix} R_1 + L_1 \cdot p & M \cdot p \\ M(p - j\omega_r) & R_2 + M(p - j\omega_r) \end{bmatrix} \begin{bmatrix} i_1 \\ i_2 \end{bmatrix} \quad (1)$$

R: resistance of each phase
$L_l$, M: self-inductance and mutual inductance
l: total leakage inductance $(=L_l - M)$
$\omega_r$: angular velocity
p: differential operator
subscript$_{1,2}$: primary and secondary Further, secondary interleakage magnetic flux $\psi_2$ and an excitation current $i_\psi$ are represented by expression (2) and (3), respectively.

$$\psi_2 = M(i_1 + i_2) \quad (2)$$

$$i_\psi = i_1 + i_2 \quad (3)$$

Expression (1) is developed into expressions (4) and (5) by using expressions (2) and (3).

$$v_l = (R_1 + l \cdot p) \cdot i_1 + p \cdot \psi_2 \quad (4)$$

$$O = R_2 \cdot i_2 + (p - j\omega_r) \cdot \psi_2 \quad (5)$$

Next, when a unit magnetic flux vector is represented by $\Theta_\psi$ on a magnetic flux rotating coordinate system, a primary current $i_1$ and a secondary current $i_2$ are represented by expressions (6) and (7), respectively.

$$i_1 = (I_\psi + jI\tau) \cdot \Theta_\psi \quad (6)$$

$$i_2 = -(1/R_2) \cdot \{p \cdot \psi_2 + j(\omega_\psi - \omega_r) \cdot \psi_2\} \cdot \Theta_\psi \quad (7)$$

where, $\Theta_\psi = \exp(j\theta_\psi)$, $\theta_\psi$: angle of magnetic flux vector, $\omega_\psi$: magnetic flux angular velocity.

In expression (6), the operation of the commands $I_\psi + jI_\tau$ and $\Theta_\psi$ is performed by the vector operation unit 8 and by the function generator 6, respectively. The vector rotator 9 inputs these two data values, performs the operation of a primary current command $i_1^*$, and outputs it as a command corresponding to expression (6).

Further, the relation between the torque current command $I\tau^*$ and a slip angular velocity command $\omega_s^*$ is represented by the next expression (8), and its operation is executed by the divider $15_2$ and the coefficient meter 4.

$$\omega_s^* = R_2^* \cdot I\tau^* / \psi_2 \qquad (8)$$

An angle command $\theta\psi^*$ of a magnetic flux vector is obtained from expression (9) by integrating the sum of a presumed angular velocity $\omega r$ output from the velocity presuming unit 13 and the slip angular velocity command $\omega s^*$ obtained from expression (8) by using integrator 5.

$$\theta\psi^* = \int \omega\psi^* dt = (\omega r \omega s^*)/p \qquad (9)$$

The primary current command $i_1^*$ output from the vector rotator 9 is converted into each current of U-, V-, and W-phase by the two-phase/three-phase converter 7, and the differences between respective electric currents of the U-, V-, and W-phases and the detected values of phase currents detected by the electric current detectors $10_1, 10_2, 10_3$ are inputted into electric current controllers $18_1, 18_2, 18_3$, respectively, following which the P-controlled results of the above inputted values are sent out to the voltage type PWM inverter 1 as voltage commands thereto. The voltage type PWM inverter 1 modulates these voltage commands to PWM signals to output to the induction motor 2. In addition, voltages between two of the U-, V-, and W-phase are detected by the voltage detector 11 and inputted into the magnetic flux operation unit 12 together with the detected value of the primary electric current. The magnetic flux operation unit 12 performs the operation of expression (10) for obtaining the magnetic flux vector $\psi_2$ by compensating a voltage drop due to the primary resistance and leakage inductance from the integral value of an inputted primary voltage $v_l$, and performs the operation of expression (11) for obtaining a torque $\tau$.

$$\phi_2 = \int \left\{ v_1 - \left( R_1^* + 1^* \cdot \frac{d}{dt} \right) i_1 \right\} dt \qquad (10)$$

$$\tau = \frac{3}{2} P Im[i_1 \cdot \bar{\phi}_2] \qquad (11)$$

Im: imaginary part operation mark
$\bar{\psi}_2$: conjugate multiple vector of $\psi_2$
P: number of motor poles After detecting the amplitude of $\psi_2$ of expression (10) as the magnetic flux detection value $\psi_2$, the torque current detection value $I\tau$ is obtained by dividing expression (11) by $\psi_2$.

In this way, the PG-less vector control is performed. With the above conventional technique, however, there has been a problem that, when a load is applied to the induction motor while it is being operated at a low speed (a regenerative condition), the absolute value of the magnetic flux angular velocity $\omega\psi$ is reduced, thereby lowering the accuracy of magnetic flux detection by the vector control unit and reducing the operational stability of the vector control unit and also causing the unit to tend to lose synchronism of operation.

SUMMARY OF THE INVENTION

An object of the present invention is to provide a vector control unit for an induction motor of the kind described at the beginning in the specification which stabilizes the operation of the induction motor when the motor is in a regenerative condition at a low speed.

According to one aspect of the present invention, there is provided a vector control unit for an induction motor comprising a detection means for detecting that the induction motor is being operated at a low speed and for detecting that the sign of a rotor electrical angular velocity command and the sign of a slip angular velocity command differ from each other, and a control means for performing control such that slip angular velocity command is not included in the magnetic flux angular velocity command when said induction motor is being operated at a low speed and the sign of the rotor electrical angular velocity command and the sign of the slip angular velocity command differ from each other.

According to another aspect of the present invention, there is provided a vector control unit for an induction motor comprising a detection means for detecting that the induction motor is being operated at a low speed and that the sign of the rotor electrical angular velocity command and the sign of the slip angular velocity command differ from each other, and a control means for subtracting the slip angular velocity command from an ordered rotor electrical angular velocity command to output the result of subtraction as a new rotor electrical angular velocity command when said induction motor is being operated at a low speed and the sign of the rotor electrical angular velocity command and the sign of the slip angular velocity command differ from each other.

When the induction motor is operated at a low speed and in a regenerative condition (the sign of the angular velocity command $\omega r^*$ differs from the sign of the slip angular velocity command $\omega s^*$), by not incorporating the slip angular velocity command $\omega s^*$ in the magnetic flux angular velocity command $\omega\psi^*$, the magnetic flux angular velocity command $\omega\psi^*$ with a greater absolute value than it originally should have is given to the motor, and by increasing the rotational speed of the induction motor, the absolute value of the magnetic flux angular velocity $\omega\psi$ is maintained without being lowered, and thus the operational stability of the vector control in the PG-less system is greatly increased. Further, by subtracting the slip angular velocity command $\omega s^*$ from the angular velocity command $\omega r^*$ and outputting the result of subtraction as a new electrical angular velocity command $\omega r^*$, the angular velocity command $\omega r^*$ with an absolute value which is larger by the absolute value of the slip angular velocity command $\omega s^*$ is given to the motor, and accordingly, the rotational speed of the induction motor is increased and the absolute value of the magnetic flux angular velocity $\omega\psi$ is maintained without being lowered, and thus the operational stability of the vector control in the PG-less system is greatly increased.

DETAILED DESCRIPTION OF THE PREFERRED PREFERRED EMBODIMENTS OF THE INVENTION

An embodiment of the present invention will next be described with reference to the drawings.

Figure 1:
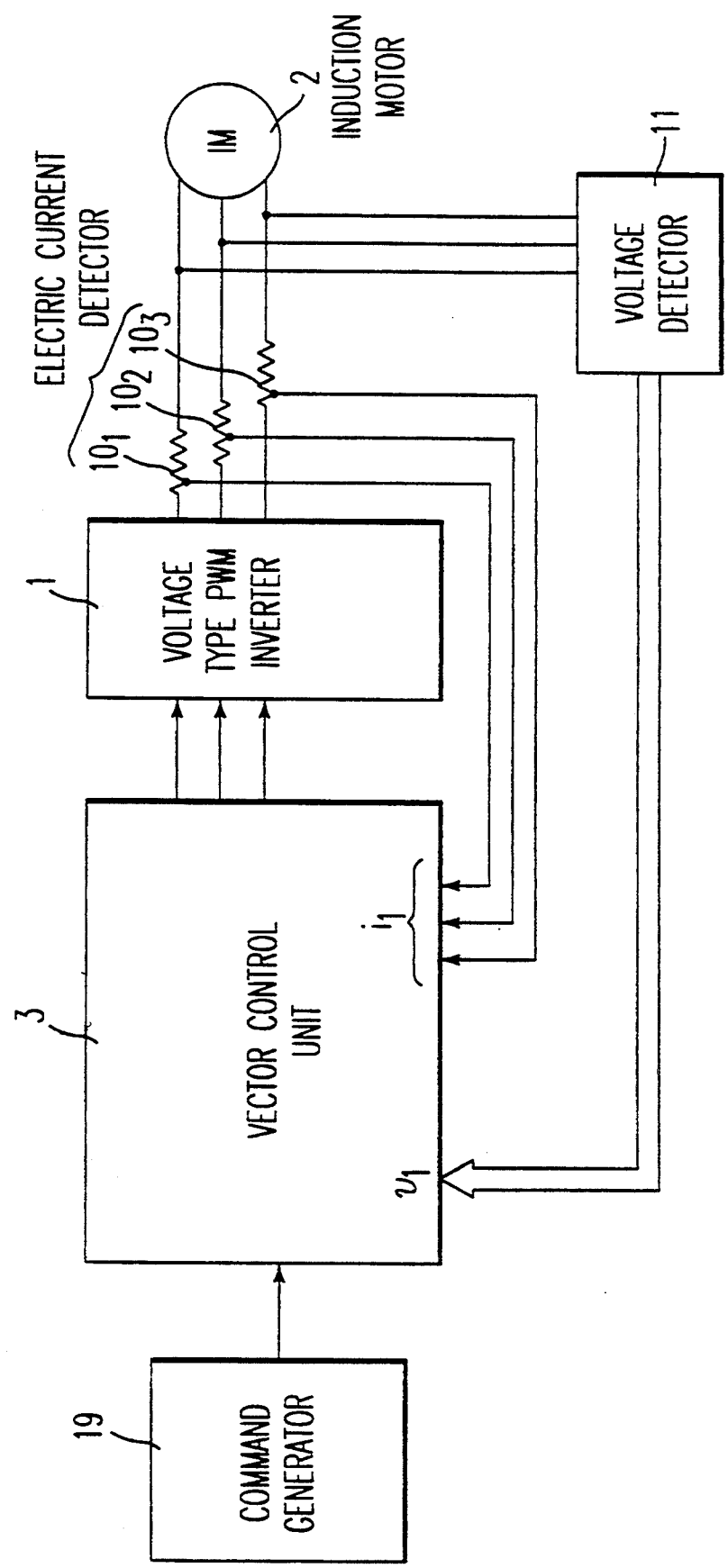
FIG. 1 is a schematic block diagram showing a conventional example of a PG-less system.
Figure 2:
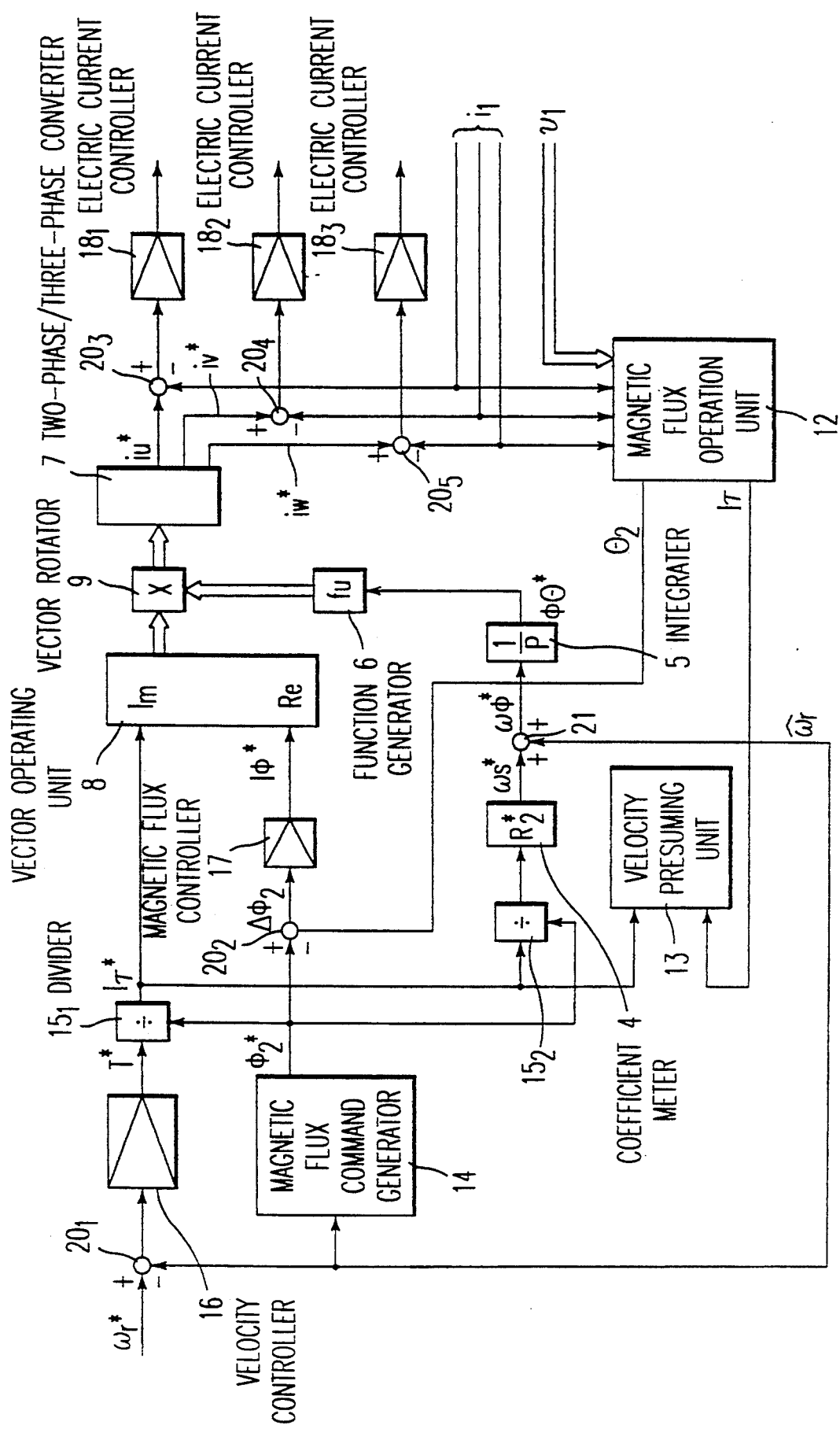
FIG. 2 is a block diagram showing a vector control unit 3 of FIG. 1.
Figure 3:
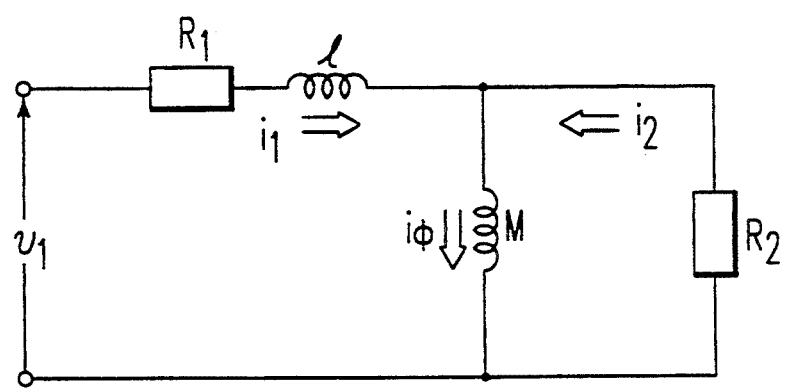
FIG. 3 is a view showing an asymmetrical T type equivalent circuit of an induction motor.
Figure 4:
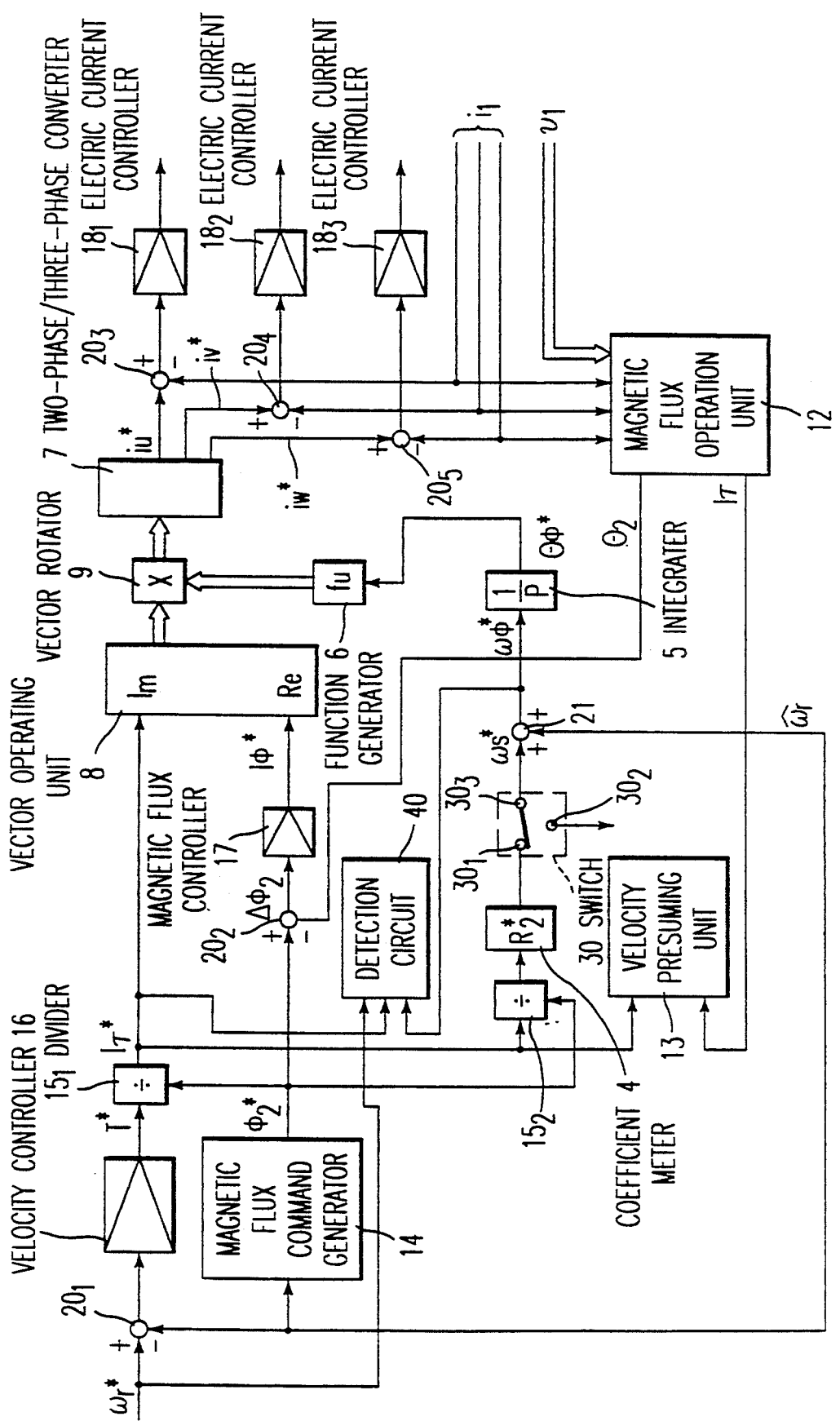
FIG. 4 is a block diagram of a vector control unit of a first embodiment of the present invention.
Figure 5:
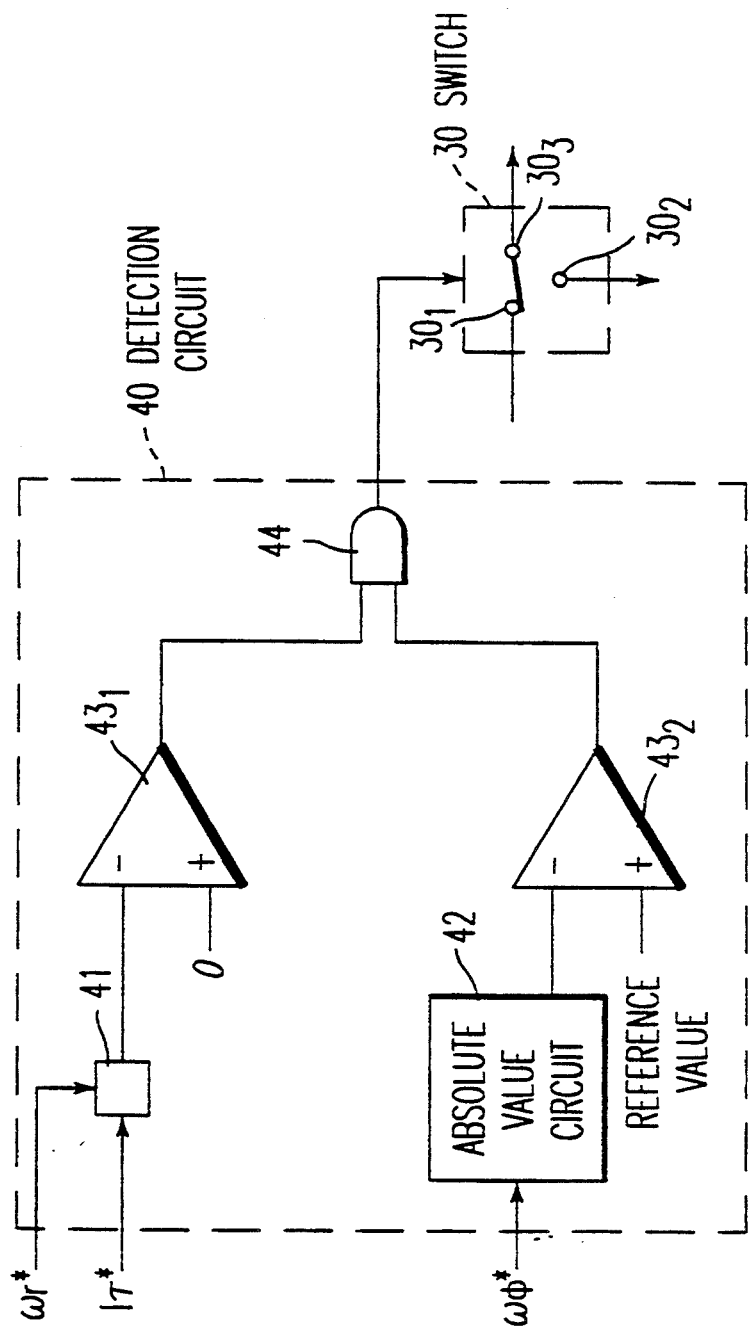
FIG. 5 is a circuit diagram of a detection circuit 40 and switch 30 of FIG. 4.

FIG. 4 is a block diagram of a vector control unit for an induction motor according to a first embodiment of the present invention. FIG. 5 is a circuit diagram of switch 30 and a detection circuit 40 shown in FIG. 4. In FIG. 4, the same components as shown in FIG. 2 are given the same reference numbers.

The present embodiment differs from the conventional example (FIG. 2) in that the embodiment includes switch 30 provided between a coefficient meter 4 and an adder 21 for adding a presumed angular velocity $\omega r$ to a slip angular velocity command $\omega s^*$, and further includes a detection circuit 40 for performing on-off control of switch 30.

As shown in FIG. 5, the detection circuit 40 consists of a multiplier 41, an absolute-value circuit 42, comparators $43_1$, $43_2$, and an AND circuit 44. The multiplier 41 calculates the product of an angular velocity command $\omega r^*$ and a torque current command $I\tau^*$. The absolute-value circuit 42 outputs the absolute value of a magnetic flux angular velocity command $\omega \psi^*$. The comparator $43_1$ compares the product of the angular velocity command $\omega r^*$ and the torque current command $I\tau^*$ with 0, and when the product is smaller than 0 (the regenerative condition), the comparator outputs a high-level signal, and when the product is larger than 0 (an electrically driven condition), the comparator outputs a low-level signal. Comparator $43_2$ compares $|\omega \psi^*|$ with a reference value, and when $|\omega \psi^*|$ is smaller than the reference value, the comparator outputs a high-level signal, and when $|\omega \psi^*|$ is larger than the reference value, the comparator outputs a low-level signal. The AND circuit 44 inputs the outputs of both comparators $43_1$, $43_2$, and outputs the high-level signal when the induction motor 2 is in the regenerative condition and the magnetic flux angular velocity command $\omega \psi^*$ is below the reference value in order to connect terminal $30_3$ of the switch 30 to terminal $30_2$ (ground voltage). Otherwise, terminal $30_3$ is connected to terminal $30_1$, resulting in the same state as established with the conventional example.

Therefore, when the motor is operated in the regenerative condition at a low speed, the slip angular velocity command $\omega s^*$ is not incorporated in the magnetic flux angular velocity command $\omega \psi^*$, with the result that the magnetic flux angular velocity command $\omega \psi^*$ made to have an absolute value larger than its original value is given to increase the rotational speed of the induction motor 2, and hence the absolute value of the magnetic flux angular velocity $\omega \psi$ is maintained without being lowered, thereby increasing of the stability of the PG-less system.

Figure 6:
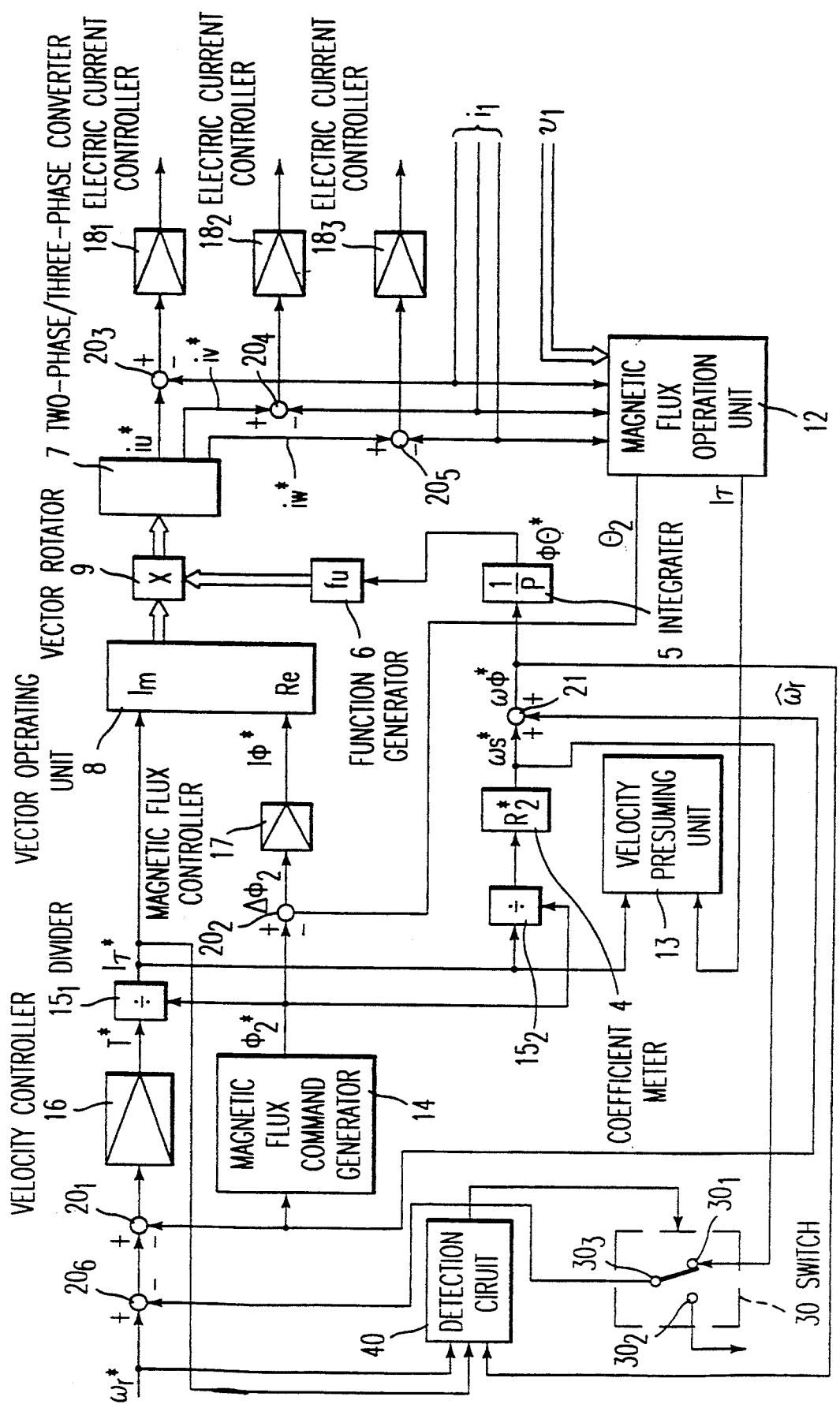
FIG. 6 is a block diagram of a vector control unit of a second embodiment of the present invention.

FIG. 6 is a block diagram of a vector control unit for an induction motor with reference to a second embodiment of the present invention.

The present embodiment comprises a switch 30 provided between the output side of a coefficient meter 4 and the input side of a velocity controller 16, and when the induction motor 2 is operated in the regenerative condition and the magnetic flux angular velocity command $\omega \psi^*$ is below the reference value, the switch 30 is operated by the detection circuit 40 to connect terminal $30_3$ to terminal $30_1$, and a new velocity command $\omega r^*$ is obtained by subtracting the slip angular velocity command $\omega s^*$ from the velocity command $\omega r^*$ by using a subtracter $20_6$. In other words, by increasing the absolute value of the velocity command $\omega r^*$ by the absolute value of the slip angular velocity command $\omega s^*$ to increase the rotational speed of the induction motor 2, the absolute value of the magnetic flux angular velocity $\omega \psi$ is maintained without being lowered, thereby increasing stability of the vector control of the PG-less system. In the present embodiment, switch 30 and subtracter $20_6$ constitute the control means.

In both the first and second embodiments, the torque current command $I\tau^*$ is used as one of means for judging the regenerative condition; however, since the values of the magnetic flux command $\psi_2^*$ and the coefficient meter 4 are always positive, quite the same result is obtained compared with the result which can be obtained by using the slip angular velocity command $\omega s^*$.

Further, as an input signal to the detection circuit 40, the presumed angular velocity $\omega r$ can be used instead of the angular velocity command $\omega r^*$, and a torque current detection value $I\tau$ can be used instead of the torque current command $I\tau^*$.

Furthermore, although examples of the conventional type and the embodiments of the invention are described with reference to the cases in which they are applied to the slip frequency type PWM inverter control unit, it is also possible to apply the present invention to a PWM inverter control unit of a magnetic flux phase standard type.

While a preferred embodiment of the invention has been described using specific terms, such description is for illustrative purposes only, and it is to be understood that changes and variations may be made without departing from the spirit or scope of the following claims.

What is claimed is:

1. A vector control unit for an induction motor connected with an inverter, the motor being not only electrically driven but also working in a regenerative condition, comprising:

detection means for detecting that said induction motor is being operated at a low speed and for detecting that the sign of a velocity command and the sign of a slip angular velocity command differ from each other;

control means for performing control such that the slip angular velocity is not included in the magnetic flux angular velocity command when said induction motor is being operated at a low speed and the sign of the velocity command and the sign of the slip angular velocity command differ from each other.

2. The vector control unit according to claim 1, wherein, said detection means comprises a multiplier for calculating the product of a velocity command $\omega r^*$ and a torque current command $I\tau^*$, an absolute value circuit for outputting the absolute value of a magnetic flux angular velocity command $\omega \psi^*$, a first comparator for comparing the product of the velocity command ωr* and the torque current command Iτ* with zero, a second comparator for comparing the absolute value of the magnetic flux angular velocity command ωψ* with a reference value, a gate circuit which inputs outputs of the first and second comparators and outputs a signal of a predetermined logical level when the product of the velocity command ωr* and the torque current command Iτ* is less than zero and the absolute value of the magnetic flux angular velocity command ωψ* is smaller than the reference value;

said control means is a switch provided in the former stage of an adder which adds the slip angular velocity command ωs* to a presumed velocity ωr to output the magnetic flux angular velocity command ωψ*, and said switch outputs said slip angular velocity command ωs* to said adder when said predetermined logic level signal is not outputted from said gate circuit and outputs zero to said adder instead of said slip angular velocity command ωs* when said predetermined logic level signal is outputted.

3. The vector control unit for an induction motor connected with an inverter, the motor being not only electrically driven but also working in a regenerative operation, comprising:

detection means for detecting that said induction motor is being operated at a low speed and for detecting that the sign of a velocity command and the sign of a slip angular velocity command differ from each other;

control means for subtracting the slip angular velocity command from an ordered velocity command to output the result of subtraction as a new velocity command when said induction motor is being operated at a low speed and the sign of the velocity command and the sign of the slip angular velocity command differ from each other.

4. The vector control unit according to claim 3, wherein, said detection means comprises a multiplier for obtaining the product of a velocity command ωr* and a torque current command Iτ*, an absolute value circuit for outputting the absolute value of a magnetic flux angular velocity command ωψ*, a first comparator for comparing the product of the velocity command ωr* and the torque current command Iτ* with zero, a second comparator for comparing the absolute value of the magnetic flux angular velocity command ωψ* with a reference value, a gate circuit which inputs outputs of the first and second comparators and outputs a signal of a predetermined logical level when the product of the angular command ωr* and the torque current command Iτ* is less than zero and the absolute value of the magnetic flux angular velocity command ωψ* is smaller than the reference value;

said control means is a switch provided in the former stage of a subtracter which subtracts a slip angular velocity command ωs* from a presumed velocity command ωr and outputs zero to said subtracter instead of said slip angular velocity command ωs* when said predetermined logic level signal is not outputted from said gate circuit and inputs said slip angular velocity command ωs* to said subtracter when said predetermined logic level signal is outputted from said gate circuit.

* * * * *